United States Patent
Redert

(10) Patent No.: US 7,298,552 B2
(45) Date of Patent: Nov. 20, 2007

(54) OBSERVER-ADAPTIVE AUTOSTEREOSCOPIC DISPLAY

(75) Inventor: Peter Andre Redert, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 261 days.

(21) Appl. No.: 10/222,220

(22) Filed: Aug. 16, 2002

(65) Prior Publication Data

US 2003/0039031 A1     Feb. 27, 2003

(51) Int. Cl.
    *G02B 27/22* (2006.01)
    *H04N 9/47* (2006.01)

(52) U.S. Cl. .................. 359/463; 359/462; 348/56; 348/59

(58) Field of Classification Search ........... 359/462, 359/463, 464, 619, 621, 622, 623, 624; 353/7, 353/8, 9, 39, 94; 348/59, 51, 56
See application file for complete search history.

(56) References Cited

U.S. PATENT DOCUMENTS

| | | | | |
|---|---|---|---|---|
| 4,111,695 A | * | 9/1978 | Yevick | ............ 359/463 |
| 5,465,175 A | * | 11/1995 | Woodgate et al. | ............ 359/463 |
| 5,993,003 A | * | 11/1999 | McLaughlin | ............ 353/7 |
| 6,337,724 B1 | * | 1/2002 | Itoh et al. | ............ 349/75 |
| 6,381,072 B1 | * | 4/2002 | Burger | ............ 359/622 |
| 2002/0118452 A1 | * | 8/2002 | Taniguchi et al. | ............ 359/463 |

FOREIGN PATENT DOCUMENTS

| | | |
|---|---|---|
| EP | 0656555 A1 | 7/1995 |
| EP | 0881844 A2 | 2/1998 |

* cited by examiner

*Primary Examiner*—Audrey Chang
(74) *Attorney, Agent, or Firm*—Larry Liberchuk

(57) ABSTRACT

An observer-adaptive autostereoscopic display system (100) comprises a display device (102) having a screen for displaying an image and a shutter (204) being electronically controlled to have transparent (230) and non transparent segments (228, 232, 234) which alternate time-sequentially in synchronism with the display device (102). The shutter (204) is designed to block light that is traveling in arbitrary directions but to let pass light which goes from the display device to predetermined positions and which is bent by lenses (208-226) of a first (202) and a second grid (206) of lenses. The lenses (208-226) are disposed in the first (202) and the second grid (206) at a predetermined pitch distance which is substantially equal to a pixel width of the image.

20 Claims, 9 Drawing Sheets

OBSERVER-ADAPTIVE AUTOSTEREOSCOPIC DISPLAY

Figure 1A:
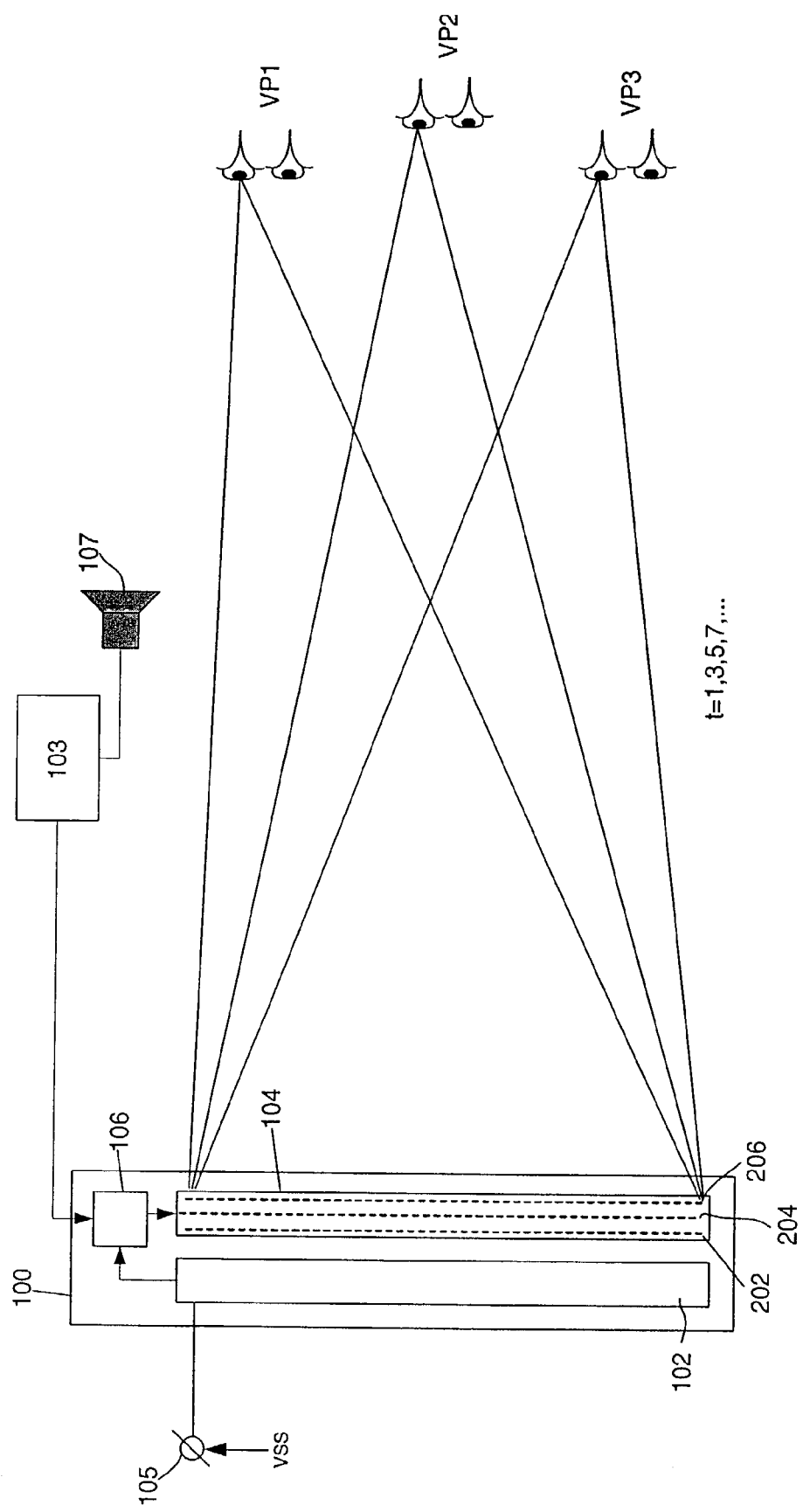

The invention relates to an observer-adaptive autostereoscopic display.

The article "A 50" time-multiplexed autostereoscopic display", by N. A. Dodgson et al. in proceedings of SPIE 3957, "Stereoscopic Displays & Applications XI", Jan. 2000, describes a CRT-based observer-adaptive autostereoscopic system that comprises a set of lenses which have a size substantially equal to the size of the CRT. The system can be considered to be two superimposed optical systems: a compound "image transfer lens" which transfers an image of the CRT into a plane of a liquid crystal display (LCD). This LCD operates like a shutter.

A Fresnel lens which projects an image of the shutter into space.

The "image transfer lens" does not project a real image: rather the observer looks through both Fresnel and projection lenses and directly views the CRT faceplate, like looking through a magnifying class. The system works by displaying each view in turn on the CRT. The LCD is placed approximately in the focal point of the projection lenses of the "image transfer lens". One of the LCD segments of the shutter is made transparent in synchronization with the image display. This directs the light from the CRT to a specific window in the eye box, i.e. location in the space where the observer is located. In terms of geometric optics, the "image transfer lens" transfers the image on the CRT face to a plane in free space. The Fresnel lens is placed at this plane, so that an image of the CRT appears to lie on its surface. The shutter is controlled in such a manner that for a predetermined period of time only the right eye can look through the superimposed optical systems to the CRT and alternatingly the left eye for the same time, and so on. The main disadvantage of the system is that it is rather bulky.

It is an object of the invention to provide an observer-adaptive autostereoscopic display that is less bulky. To this end, the invention provides an observer-adaptive autostereoscopic display system and unit as defined by the independent claims. The dependent claims define advantageous embodiments.

The main difference to the prior art is that in the display system according to a preferred embodiment of the invention the optical system is replaced by a large number of smaller optical modules which are placed in a grid structure. The optical modules operate only on light originating from groups of pixels while the former optical system operates on light originating from the entire screen. The number of pixels of a group is substantially less than the number of pixels of an entire image. The number of pixels of a group may e.g. be equal to one, or equal to the number of pixels of one column of an image or equal to the number of pixels of one row of an image. The depth of the optical modules is substantially less than the depth of the former optical system. Another advantage is that with the display system according to the invention a better separation of views is achieved. Besides that the display system according to the invention supports viewing stereo images by multiple users simultaneously by using only one display device.

In an embodiment of the observer-adaptive autostereoscopic display system according to the invention, the segments have a width that is substantially smaller than the pixel width. The size of the segments is related to positional accuracy of the projection of the light-beam. This means that the separation of views is related to the size of the segments. Preferably the width of the segments is approximately hundred times smaller than the pixel width.

In an embodiment of the observer-adaptive autostereoscopic display system according to the invention, the lenses are linear. Normal full, i.e. circular lenses bend light both in x and y direction. Linear lenses are strips, e.g. cylindrical, that bend light either in x or y direction and do not bend the light in the other direction. Both full and linear lenses can be used, but linear lenses are preferred because usage of these lenses reduces costs: the number of lenses is reduced. Preferably the linear lenses extent from top to bottom of the screen. Alternatively the linear lenses extent from left to right of the screen. As a consequence one linear lens is related to pixels of one column of the image respectively one row of the image.

In an embodiment of the observer-adaptive autostereoscopic display system according to the invention, the segments have a length that is substantially equal to a size of the screen. It is preferred that both the lenses in the first grid and the lenses in the second grid are linear. It is preferred that in the case that linear lenses are used, the segments are also rectangular. Then the number of segments is limited, resulting in a less complex shutter which is less expensive.

An embodiment of the observer-adaptive autostereoscopic display system according to the invention comprises a light-separation device. It is important that light passing a particular lens of the first grid also passes the corresponding lens of the second grid and not, or as little as possible, passes another lens of the second grid. In other words cross-talk and distortions must be prevented.

In an embodiment of the observer-adaptive autostereoscopic display system according to the invention, the light-separation device comprises a grid of mirrors. A first approach to prevent cross-talk is to reflect light. An advantage of applying mirrors is that only relatively few light is lost.

In another embodiment of the observer-adaptive autostereoscopic display system according to the invention, the light-separation device comprises a grid of black boxes. A second approach to prevent cross-talk is to absorb light. An advantage of this embodiment of the separation device is its simplicity.

In another embodiment of the observer-adaptive autostereoscopic display system according to the invention, the light-separation device comprises a Fresnel lens. A third approach to prevent cross-talk is to bend light. An advantage of applying a Fresnel lens is that only relatively few light is lost.

An embodiment of the observer-adaptive autostereoscopic display system according to the invention is characterized in that the first grid, the shutter and the second grid are located in a solid transparent box with a relatively high refraction index. The advantage of this embodiment is that the viewing angle is extended.

Modifications of the observer-adaptive autostereoscopic display system and variations thereof may correspond to modifications and variations thereof of the observer-adaptive autostereoscopic display unit described.

Figure 1B:
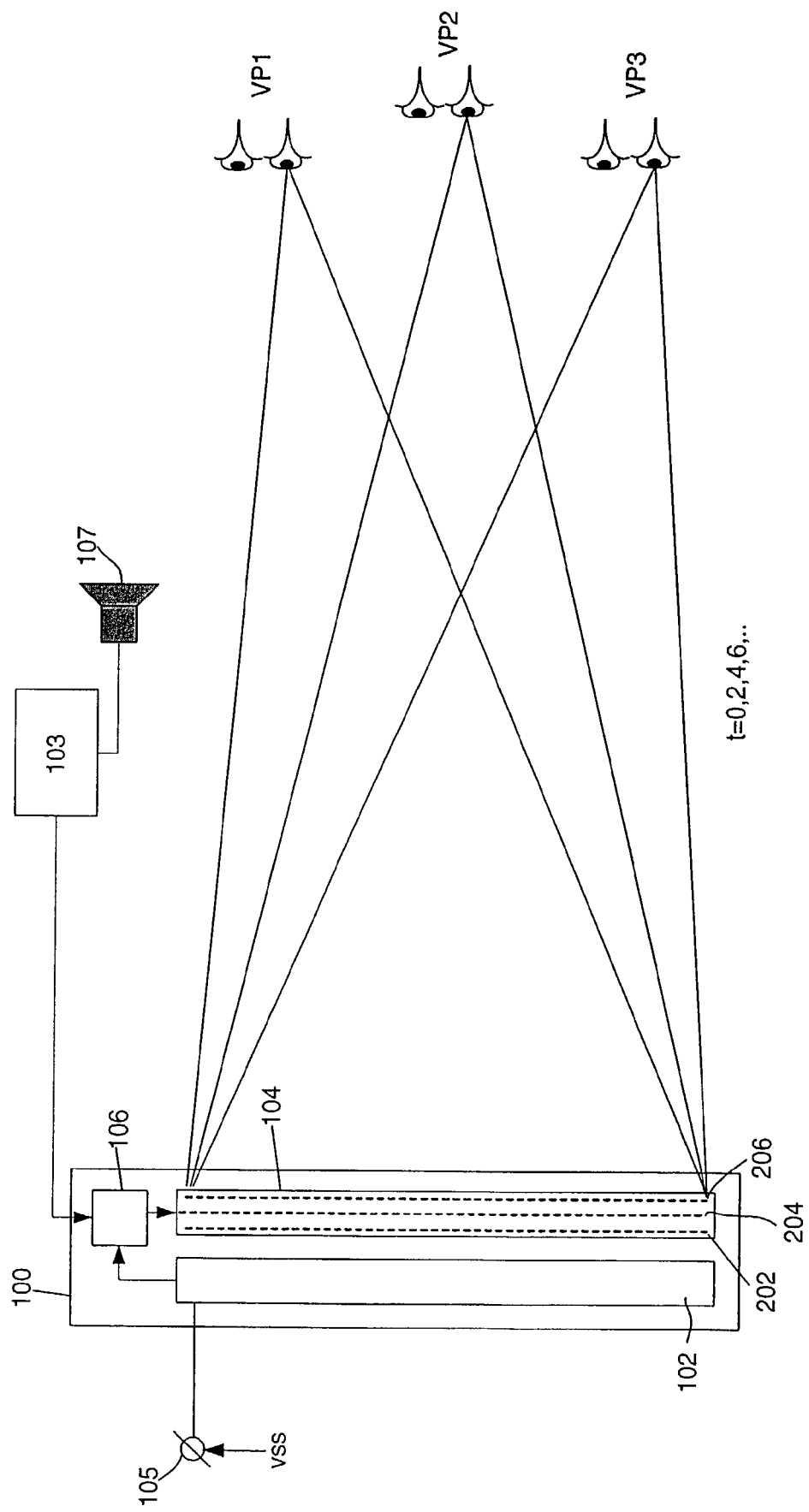
Figure 2A:
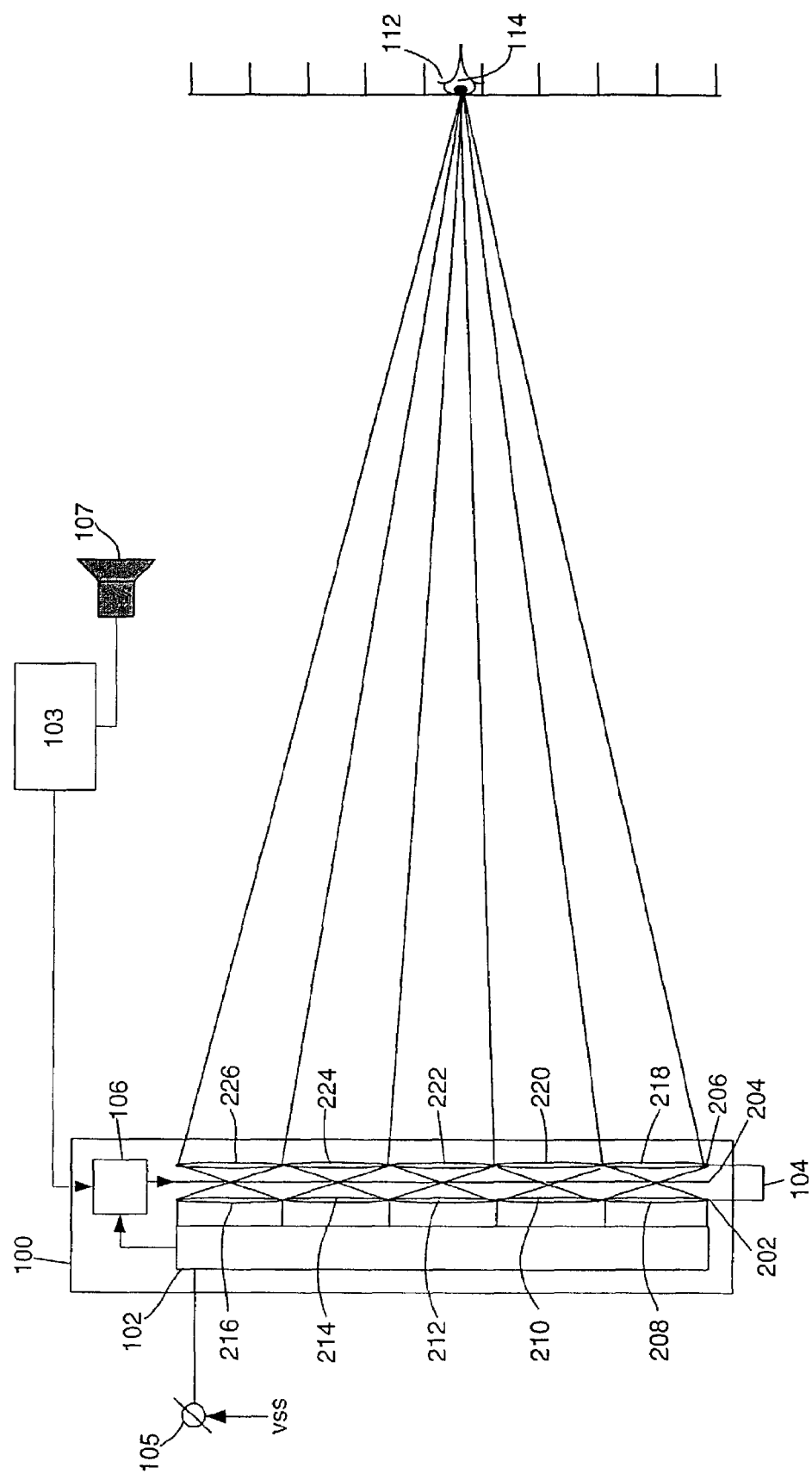
Figure 2B:
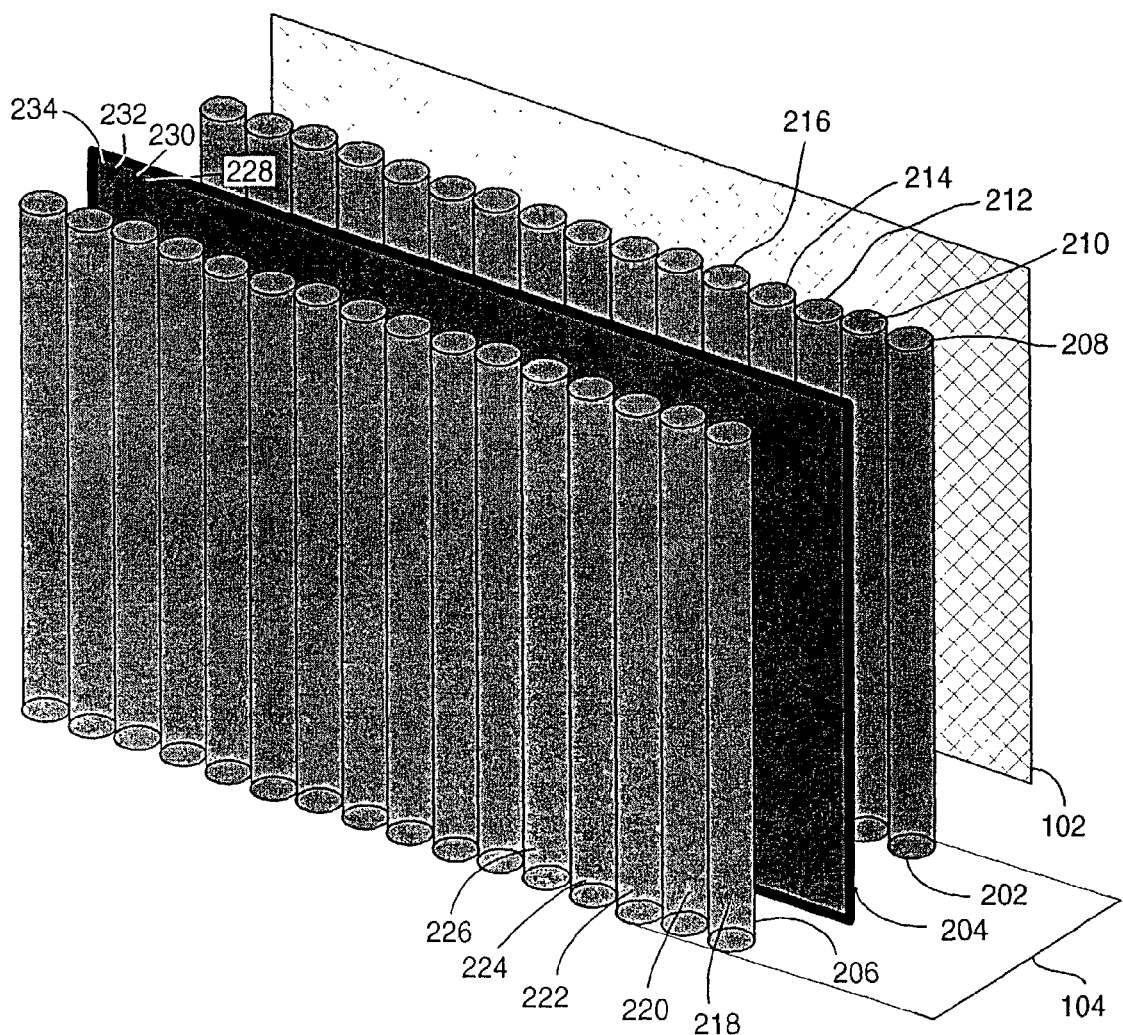
Figure 3:
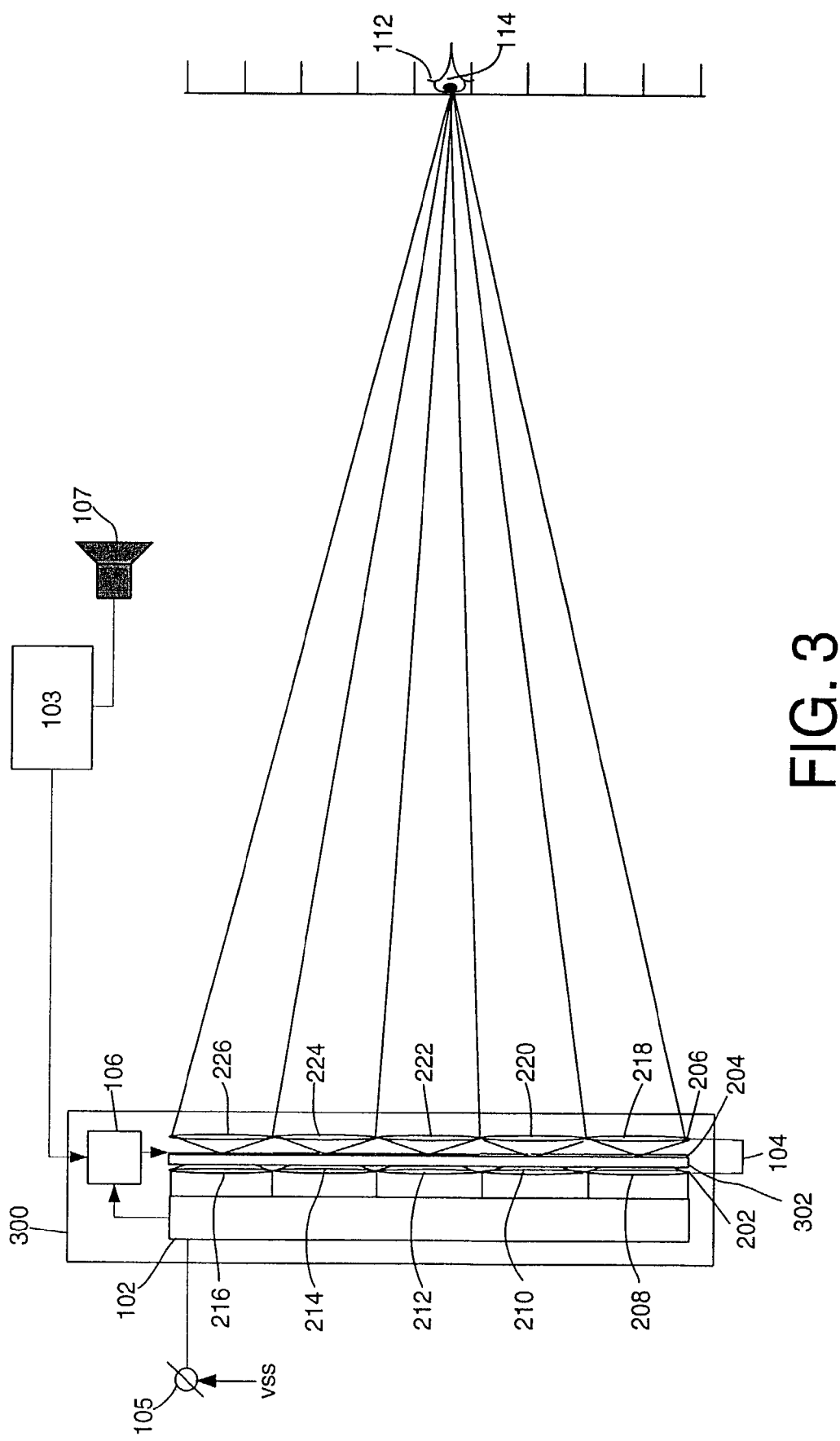
Figure 4A:
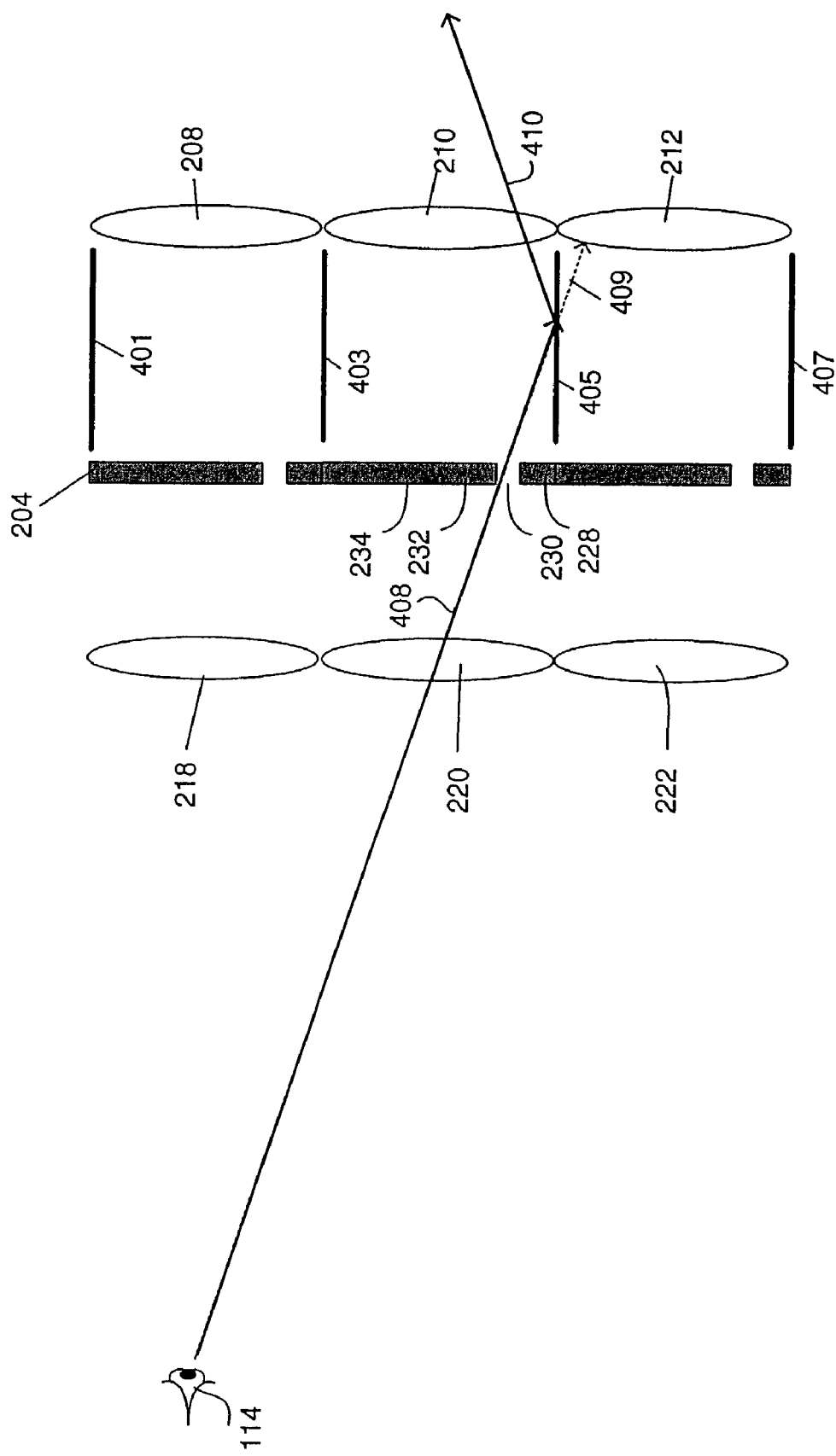
Figure 4B:
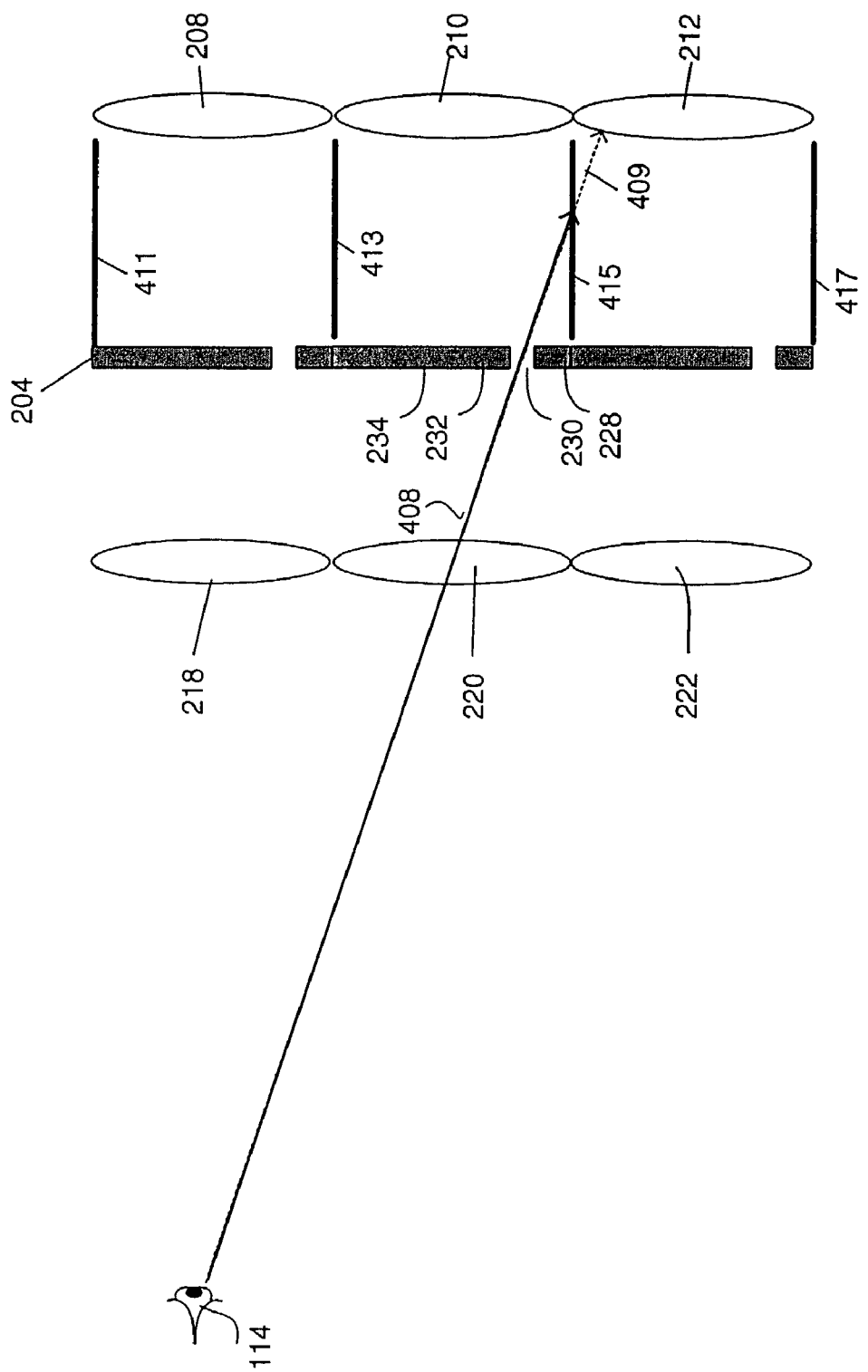
Figure 4C:
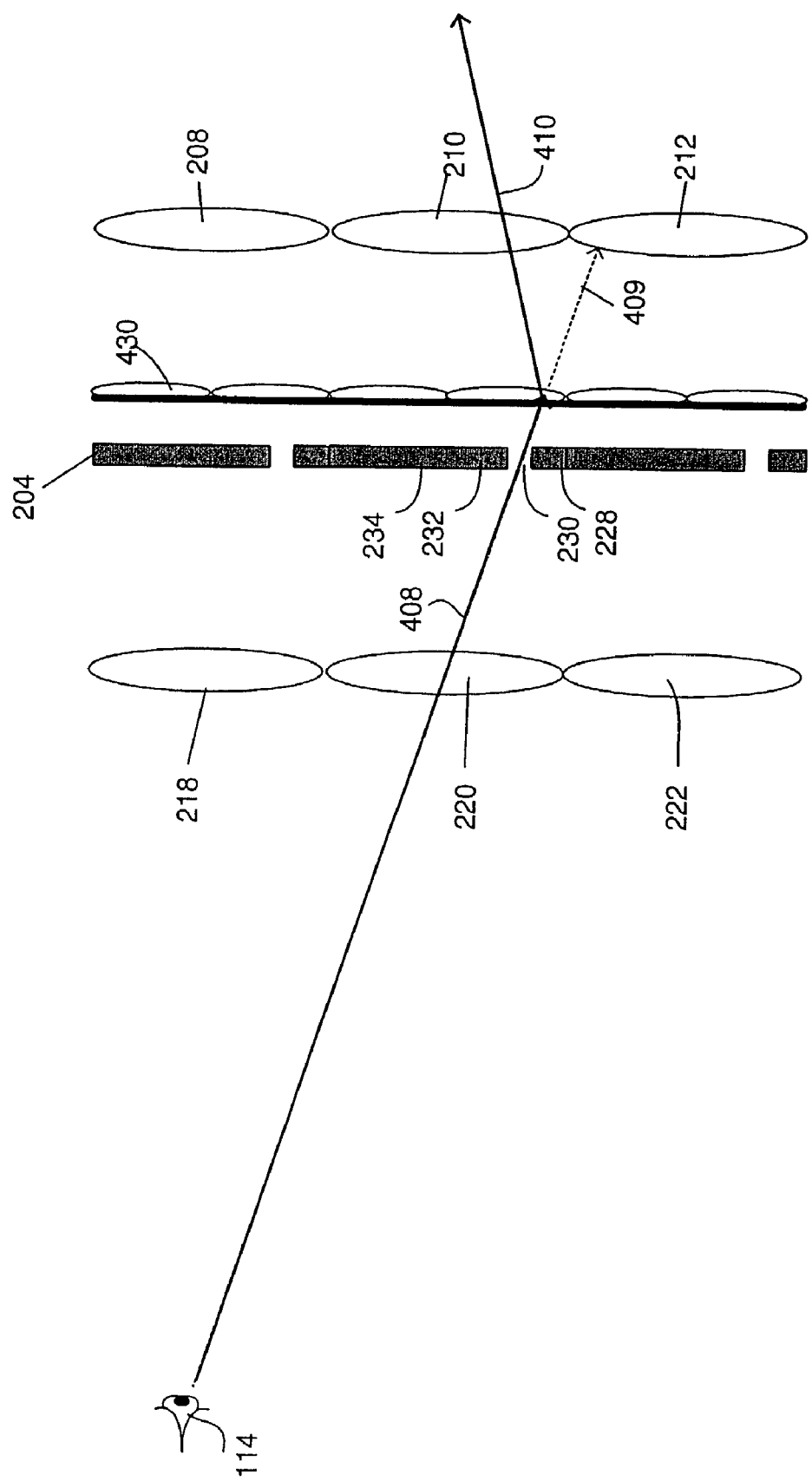
Figure 5:
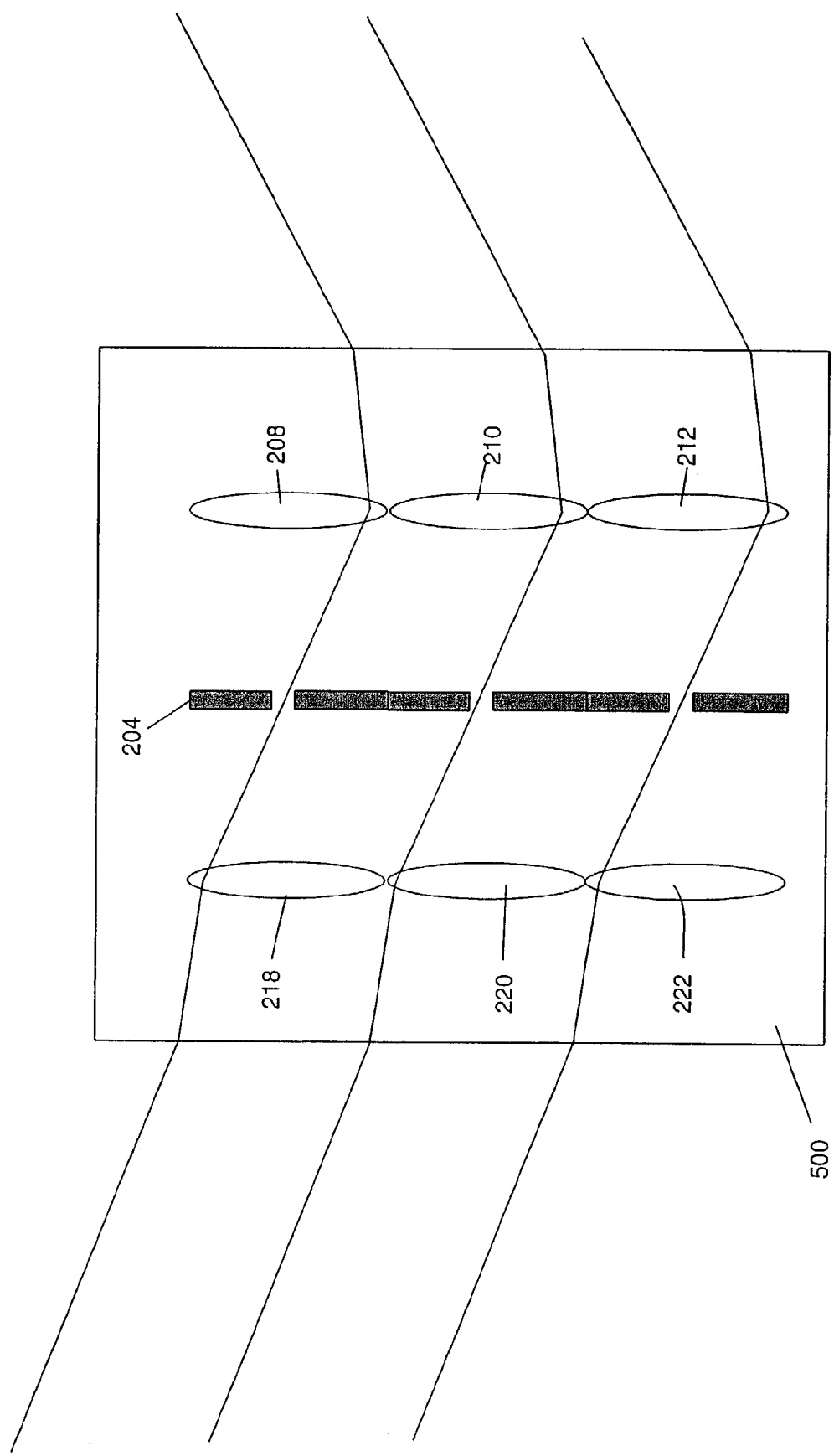

These and other aspects of the observer-adaptive autostereoscopic display system and unit according to the invention will become apparent from and will be elucidated with respect to the implementations and embodiments described hereinafter and with reference to the accompanying drawings, wherein:

FIG. 1A schematically shows an embodiment of the observer-adaptive autostereoscopic display system with 3 viewers seeing an image with their right eye;

FIG. 1B schematically shows an embodiment of the observer-adaptive autostereoscopic display system with 3 viewers seeing an image with their left eye;

FIG. 2A schematically shows a top view of an embodiment of the observer-adaptive autostereoscopic display system according to the invention;

FIG. 2B schematically shows a perspective view of a part of an embodiment of the observer-adaptive autostereoscopic display system according to the invention;

FIG. 3 schematically shows an embodiment of the observer-adaptive autostereoscopic display system comprising a light-separation device;

FIG. 4A schematically shows the principle of the light-separation device based on mirrors;

FIG. 4B schematically shows the principle of the light-separation device based on black boxes;

FIG. 4C schematically shows the principle of the light-separation device based on a lens; and FIG. 5 schematically shows an embodiment of a part of the observer-adaptive autostereoscopic display system in which the first grid, the shutter and the second grid are located in a solid transparent box with a relatively high refraction index. Corresponding reference numerals have the same meaning in all of the Figs.

FIG. 1A and FIG. 1B schematically show an embodiment of the observer-adaptive autostereoscopic display system 100 with 3 viewers seeing an image with their right and left eyes, respectively. The observer-adaptive autostereoscopic display system 100 is capable of displaying M original 3D video or TV programs in a time multiplex composite input video stream signal VSS to n=1, 2, ... or N observers on an observer and image selective basis, as will be explained in more detail hereinafter. Each of those M original 3D video or TV programs entering the display system 100 is composed of e.g. K original 3D images formed by 2D left and right eye views, each of those 2D left and right eye views being focused at the corresponding eyes of predetermined viewers VP1-VP3.

Such time multiplex composite input video stream signal VSS which is provided at the input connector 105, comprises a periodic sequence of pairs of images carrying pixel data of two dimensional (2D) left and right eye views Vlij and Vrij of a 3D image IMij, in which i=1, 2 ... K, being the number within a sequence of K 3D images constituting video program j, in which j=1, 2 ... M, M being the total number of 3D TV programs, which are supplied to the display device 102. The display device 102 converts the electrical pixel data into optical pixel data carried by lightbeams or rays, emitted to the rear end of so-called directivity optics 104 located in front of the display device 102. The display device 102 supplies view index data i,j of the left and right eye views Vlij and Vrij to a directivity driver 106 for synchronizing the operation of the display device 102 with the directivity optics 104.

To the autostereoscopic display system 100 is connected a viewpoint tracker having a 3D eye localisator 107 for detecting the xyz co-ordinates of all viewer eyes individually within the viewing range of the display device 102. Such viewpoint tracker is on itself known e.g. from European Patent 0 946 066. The 3D eye localisator 107 is coupled to a view point control signal generator 103 providing a view point indicative control signal to the directivity driver 106. The directivity driver 106 generates a direction control signal using the view point indicative control signal and the view index data i,j and, which is supplied to the directivity driver 106 by the display device 102. Under control of the direction control signal, the directivity optics 104 focus the lightbeams carrying pixel data of the left and right eye views Vlij and Vrij to the corresponding eyes of a predetermined observer or viewer n authorized to view the above video or TV program j. More in particular, the display device 102 emits light in various directions. In front of the display device 102 are directivity optics 104, that can change the direction of the light-rays and optionally block the light-rays in order to enter one, several, or all viewers eyes. The directivity driver 106 decides for each of the eyes independently whether it can see the display or not. The 3D eye localisator 107 provides the directivity driver 106 with xyz co-ordinates of all eyes, so that the directivity optics 104 can properly be adjusted by the directivity driver 106.

For the sake of clarity, the invention shall be described with reference to FIGS. 1A and 1B on the basis of a single 3D video or TV program being constituted of a series of 3D images IM1 to IMK, which is to be transmitted to three observers or viewers VP1-VP3. Suppose each of the 3D images IM1 to IMK consists of 2D left and right eye views Vl1 to VlK and Vr1 to VrK, respectively, supplied by the display device 102 in an alternate sequence of even and odd images occurring in even time slots t=0, 2, 4, ... and odd timeslots t=1, 3, 5, ..., respectively, of the above time multiplex composite input video stream signal VSS. Then in the even timeslots the display device 102 is set in a left view mode to deal with left eye views Vli (i=1 ... K) only, as shown in FIG. 1B. In the odd timeslots the display device 102 is set in a right view mode to deal with right eye views Vri (i=1 ... K) only, as shown in FIG. 1A. For the display of a single 3D image IMk, the 2D left and right eye views Vlk and Vrk thereof occurring in timeslots 2(k−1) and 2k−1 respectively, the directivity driver 106 controls the directivity optics 104 to focus all lightbeams carrying pixel data of the left eye views Vlk in the even timeslot 2(k−1) into a left view focus point or apex coinciding with the left eye viewpoints of observers VP1-VP3 and to focus all lightbeams carrying pixel data of the right eye views Vlk in the odd timeslot 2k−1 into a right view apex coinciding with the right eye viewpoints of the observers VP1-VP3. Synchronization in the alternate switching of the display device 102 from the left view mode into the right view mode and vice versa, with time multiplexed transmission of the 2D left and right eye views Vli and Vri from the display device 102 to the directivity optics 104 is achieved with the view index data i supplied by the display device 102 to the directivity driver 106. By using the above view point indicative control signal provided by the viewpoint tracker VT to dynamically adapt the left and right view apex to the actual position of the eyes of each viewer, a correctly distinct focus of the 2D left and right eye views Vl and Vr of all 3D images IM1 to IMK to the eyes of each of the viewers VP1-VP3 is obtained, resulting in a correct 3D image perception of the complete 3D video or TV program at all three view points VP1-VP3, independent from the viewers position and movement within the viewing range of the display device.

FIG. 2A schematically shows a top view of an embodiment of the observer-adaptive autostereoscopic display system 100 according to the invention comprising:

a display device 102 having a screen for displaying an image;

directivity optics 104 which comprise:

a first grid 202 comprising a plurality of lenses first 208-216 which are disposed at a predetermined pitch distance which is substantially equal to a pixel width of the image;

a shutter 204 being electronically controlled to have transparent and non transparent segments which alternate time-sequentially in synchronism with the display device 102; and a second grid 206 which is substantially aligned with the first grid 202 and which comprises a plurality of second lenses 218-226 which are disposed at the predetermined pitch distance.

a directivity driver 106 for control of the directivity optics 104. The directivity optics 104 can be considered to comprise for a group of pixels a first lens, e.g. 208, a barrier 204 and a second lens, e.g. 218. The barrier is a portion of the shutter 204 or in other words a number of segments of the total number of segments which the shutter comprises. The shutter may be an LCD or a Polymer LC/gel type. The display device 102 may be any type of display, e.g. CRT, PDP, TFT or LCD. The working of the optical modules is as follows. Light from the display device 102 is focused by the first lens, e.g. 208, of the particular module. At a distance which is approximately equal to the focal length of this first lens the shutter 204 is located. Light can only pass this shutter 204 through the transparent segments and is blocked for all other segments. One segment per viewer is transparent per time slot. The position of the eyes of the viewers determine which segments are transparent and which are not. Light passes the shutter through a transparent segment and is subsequently directed through the corresponding second lens, e.g. 218. This second lens 218 directs the light to e.g. the particular position 112 in which eye 114 is located.

FIG. 2B schematically shows a perspective view of a part of an embodiment of the observer-adaptive autostereoscopic display system according to the invention. The first grid 202 comprising a plurality of lenses 208-216 which are disposed in a direction which is substantially vertical. The second grid 206 is substantially aligned with the first grid 202 and comprises a plurality of lenses 218-226. In between the first 202 and the second grid 206 the shutter 204 is located which comprises a number of segments 228-234 which are also oriented in a direction which is substantially vertical. The first 202 and the second grid 206 together with the shutter 204 are placed in front of a screen of a standard display device 102. In principle, this display device 102 does not have to be modified for this purpose. The dimensions of the first grid 202, the second grid 206, the shutter 204 and the screen of the display device 102 are substantially mutually equal. In the case of a standard CRT display with size 80×60 cm and with CCIR resolution of approximately 700×600, the pixel size is approximately 1 mm. In that case each lens is approximately 1 mm by 60 cm. The focal length of the lenses is approximately 2 mm. The depth of the directivity optics 104 is less than 1 cm.

FIG. 3 schematically shows an embodiment of the observer-adaptive autostereoscopic display system 300 comprising a light-sepration device 302. The light-separation device 302 is located between the first grid 202 and the shutter 204. Alternatively the light-separation device 302 is located between the second grid 206 and the shutter 204. The purpose of the light-separation device 302 is to prevent that light from a particular lens, e.g. 208 does not pass to a second lens, e.g. 220 which does not correspond to the particular lens. Otherwise image distortions will appear.

FIG. 4A schematically shows the principle of the light-separation device 302 based on mirrors 401-407. If no precautions are set then an observer who views with his eye 114 from a point which is not inside the viewing angle will notice image distortions. This will be described hereinafter with rays in reverse direction. That means from an eye 114 of the observer to the display device 102. A ray 409 would subsequently pass lens 220, the transparent segment 210 of the shutter 204 and lens 212. However lens 212 and 220 are not lenses that correspond to each other, i.e. belong to the same module. But the mirror 405 reflects the ray. The ray 410 passes lens 210 in the direction of the appropriate pixel of the display device 102. Hence ray 408 continues as ray 410. Several techniques are available to construct these "micro"-mirrors, e.g. damping of metal.

FIG. 4B schematically shows the principle of the light-separation device 302 based on black boxes with light-absorbing walls 411-417. In this case ray 409 is substantially absorbed by wall 415 of a black box of the separation device. Some light will be lost but distortions are prevented.

FIG. 4C schematically shows the principle of the light-separation device 302 based on a Fresnel lens 430. In this case ray 409 is bent by lens 430. Hence ray 408 continues as ray 410 in the direction of the appropriate pixel of the display device 102. The Fresnel lens 430 has a focal length which is less then the focal length of the lenses 218-222 and 208-212. Typically the focal length will be twice as small. Optionally a grid of lenses is used instead of a Fresnel lens 430.

FIG. 5 schematically shows an embodiment of a part of the observer-adaptive autostereoscopic display system in which the first grid 202 with lenses 218-222, the shutter 204 and the second grid 206 with lenses 208-212 are located in a solid transparent box 500 with a relatively high refraction index. Optionally a light-separation device 302 is included in the transparent box 500 too. Of course the lenses have a refraction index which is higher than the refraction index of the material of the solid transparent box 500. The effect of the box is that light is also bent at the borders of the solid transparent box 500. As a consequence the total viewing is extended compared to an embodiment without the solid transparent box 500. An extension of the viewing angle with a factor of two is feasible.

Whenever the shutter is fully open, the display system and unit appear normal and can show conventional monoscopic images with normal frame rate.

It should be noted that the above-mentioned embodiments illustrate rather than limit the invention and that those skilled in the art will be able to design alternative embodiments without departing from the scope of the appended claims. In the claims, any reference signs placed between parentheses shall not be construed as limiting the claim. The word 'comprising' does not exclude the presence of elements or steps not listed in a claim. The word "a" or "an" preceding an element does not exclude the presence of a plurality of such elements. The invention can be implemented by means of hardware comprising several distinct elements and by means of a suitable programmed computer. In the unit claims enumerating several means, of these means can be embodied by one and the same item of hardware

The invention claimed is:

1. A display system comprising:
    a single display device having a screen for displaying an image comprising a plurality of pixels, each pixel having a pixel width;
    a first grid positioned in front of the screen of the single display device along a viewing direction and comprising a plurality of lenses that are disposed at a predetermined pitch distance that is substantially equal to the pixel width, all of the lenses of the first aid being arranged in front of the screen of the single display device along the viewing direction such that each of the lenses of the first grid is arranged to face only a respective portion of the screen of the single display device;

a directivity driver;

a shutter positioned in front of the first grid along a viewing direction and configured to be electronically controlled by the directivity driver to provide select transparent and non-transparent segments in synchronism with a display of the image on the screen of the display device; and a second grid positioned in front of the shutter along a viewing direction and substantially aligned with the first grid, the second grid comprising a plurality of lenses that are disposed at the predetermined pitch distance.

2. The display system as claimed in claim 1, wherein the lenses are linear.

3. The display system as claimed in claim 2, wherein the segments together have a length that is substantially equal to a size of the screen.

4. The display system as claimed in claim 1, further including:

a light-separating device that is positioned between the first and second grids and comprising light separation portions that are substantially aligned with the lenses of the first and second grids.

5. The display system as claimed in claim 4, wherein the light-separation device comprises a grid of mirrors.

6. The display system as claimed in claim 4, wherein the light-separation device comprises a grid of black boxes.

7. The display system as claimed in claim 4, wherein the light-separation device comprises a Fresnel lens.

8. The display system of claim 4, wherein the light-separation device is arranged between the first grid and the shutter.

9. The display system as claimed in claim 1, wherein the first grid, the shutter and the second grid are located in a solid transparent box with a relatively high refraction index.

10. The display system of claim 1, further including;

a sensor that is configured to determine a location of one or more viewers relative to the display device, and wherein the shutter is further controlled based on the location of the one or more viewers.

11. The display system of claim 10, wherein the sensor is configured to determine a location of each of a pair of eyes of each of the one or more viewers, and the shutter is further controlled based on the location of each eye.

12. The display system of claim 1, wherein the shutter is controlled in synchronism with right-eye and left-eye images being displayed on the screen of the single display device.

13. The display system of claim 1, wherein a width of each of the select transparent segments is substantially less than the pixel width.

14. The display system of claim 1, wherein each of the lenses of the first grid is arranged to face a portion of the screen on which a single, respective one of the pixels of the image is displayed whereby the number of lenses in the first grid is equal to the number of pixels in the image.

15. The display system of claim 1, wherein each of the lenses of the first grid is arranged to face a portion of the screen on which a single, respective column or row of the pixels of the image is displayed whereby the number of lenses in the first grid is equal to the number of columns or rows of pixels in the image.

16. The display system of claim 1, wherein each of the lenses of the second grid is arranged in correspondence with a respective one of the lenses of the first grid such that there are an equal number of lenses in the first grid as in the second grid.

17. The display system of claim 1, wherein the shutter consists of a single shutter having a size which is substantially equal to the size of the first grid and the size of the second grid.

18. A shuttered lens system for use with a display system that displays an image comprising a plurality of pixels, the display system having a screen on which the image is display, the shuttered lens system comprising:

a first grid comprising a plurality of lenses that are disposed at a predetermined pitch distance that is substantially equal to a width of a pixel of the plurality of pixels, all of the lenses of the first grid being arranged in front of the screen along the viewing direction such that each of the lenses of the first grid is arranged to face only a respective portion of the screen of the single display device;

a directivity driver;

a single shutter that is configured to be electronically controlled by the directivity driver to provide select transparent and non-transparent segments; and a second grid that is substantially aligned with the first grid and which comprises a plurality of lenses that are disposed at the predetermined pitch distance, the shutter being positioned between the first grid and the second grid and having a size which is substantially equal to the size of the first grid and the size of the second grid.

19. The shuttered lens system of claim 18, wherein a width of each of the select transparent segments is substantially less than the width of the pixel.

20. The shuttered lens system of claim 18, wherein the shutter is separated from both the first grid and the second grid.

* * * * *